United States Patent Office 3,377,316
Patented Apr. 9, 1968

3,377,316
POLYHYDROXYAMINOUREAS AND METHOD OF MAKING SAME
Norman H. Reinking, Millington, and Warren F. Hale, Somerville, N.J., assignors to Union Carbide Corporation, a corporation of New York
No Drawing. Filed Aug. 20, 1965, Ser. No. 481,389
22 Claims. (Cl. 260—47)

This invention relates to polyhydroxyaminoureas and more particularly to those containing a piperazine nucleus.

Polyureas or polyamides of carbonic acid are generally higher melting and less soluble than other polyamides and have shown limited utility because of the difficulties encountered at high melt fabrication temperatures where these polymers are thermally unstable.

Polyureas of piperazines for example, char before they melt and are soluble only in highly polar solvents such as hot p-chlorophenol and formic acid.

It is, therefore, an object of this invention to provide polyureas having high physical strength, chemical resistance and fiber and film forming properties.

It is another object to provide polyureas which can be melt fabricated without charring.

It is still another object to provide polyureas which are soluble in common commercially available solvents.

Other objects will become apparent to those skilled in the art upon an examination of the specification which follows.

It has now been found that the above objects are satisfied by polyhydroxyaminoureas which can be represented by the following formula:

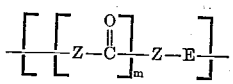

wherein Z is a 1,4-piperazine diradical (1,4-piperazinylene radical), E is a hydroxyl containing radical residuum of an epoxide, and $m$ is an integer from 1 to 2.

The 1,4-piperazine diradicals of the polymers of this invention can be unsubstituted or substituted with from 1 to 8 alkyl groups each having up to 20 carbon atoms.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus

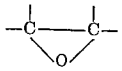

A monoepoxide contains one such oxirane group and provides a radical residuum, E, containing a single hydroxyl group, a diepoxide contains two such oxirane groups and provides a radical residuum, E, containing two hydroxyl groups. Saturated epoxides, by which term is meant diepoxides free of ethylenic unsaturation, i.e., >C=C< and acetylenic unsaturation, i.e., —C≡C—, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epihalohydrins such as epichlorohydrin, epibromohydrin, 1,2-epoxy-1-methyl-3-chloropropane, 1,2-epoxy-1-butyl-3-chloropropane, 1,2-epoxy-2-methyl-3-bromopropane, and the like.

Illustrative diepoxides include diethylene glycol bis-(3,4 - epoxycyclohexane-carboxylate), bis-3,4-epoxycyclohexylmethyl)adipate, bis(3,4 - epoxycyclohexylmethyl) phthalate, 6-methyl-3,4-epoxycyclohexylmethyl-6-methyl-3,4 - epoxycyclohexane - carboxylate, 2 - chloro - 3,4-epoxycyclohexylmethyl - 2 - chloro-3,4-epoxycyclohexane-carboxylate, diglycidyl ether, bis(2,3-epoxycyclopentyl)ether, 1,5-pentanediol bis(6-methyl-3,4-epoxycyclohexylmethyl)ether, bis(2,3-epoxy-2-ethylhexyl)adipate, diglycidyl maleate, diglycidyl phthalate, 3-oxatetracyclo [4.4.0.1$^{7,10}$.0$^{2,4}$]undec-8-yl 2,3-epoxypropylether, bis(2,3-epoxycyclopentyl)sulfone, 2,2' - sulfonyldiethyl bis(2,3-epoxycyclopentane - carboxylate), 3 - oxatetracyclo-[4.4.0.1$^{7,10}$.0$^{2,4}$]undec-8-yl 2,3-epoxybutyrate, 4-pentenal-di-(6-methyl-3,4-epoxycyclohexylmethyl)acetal, ethylene glycol bis-(9,10-epoxystearate), diglycidyl carbonate, bis (2,3-epoxybutylphenyl)-2-ethylhexyl phosphate, diepoxydioxane, butadiene dioxide, and 2,3-dimethyl butadiene dioxide. The preferred diepoxides are those wherein each of the oxirane groups is connected to an electron donating substituent which is one carbon removed from the carbon atoms of the oxirane group. Such diepoxides have the grouping

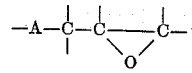

wherein A is an electron donating substituent such as

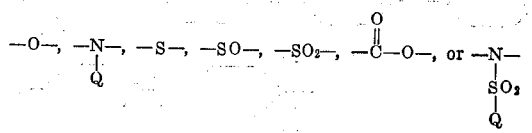

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing the polymers of this invention and the terms "monoepoxide" and "diepoxide" are intended to include a mixture of at least two monoepoxides or diepoxides, respectively.

Melt flow of each of the thermoplastic polyhydroxyaminoureas was determined by weighing in grams the amount of polyhydroxyaminourea, which, at a temperature of 220° C. and under a pressure of 44 p.s.i., flowed through an orifice having a diameter of 0.0825" and a length of 0.315" over a ten minute period. Four such determinations were made and the average of the four determinations is reported as decigrams per minute under a pressure of 44 p.s.i. and at 220° C.

Glass transition temperatures, also referred to as second order phase transition temperatures, refer to the temperatures of the inflection points found by plotting the resilience (recovery from 1% elongation) of a film, ranging in thickness from 3–15 mils, against the temperature. A detailed explanation for determining resilience and inflection temperatures is to be found in an article by A. Brown in "Textile Research Journal," 25, 891 (1955).

Three main classes of polymers are provided in the instant invention. The first can be illustrated by the interaction of N,N'-carbonylpiperazine with butadiene dioxide to form a polyhydroxyaminourea having 2 pendant hydroxyl groups in each repeating unit.

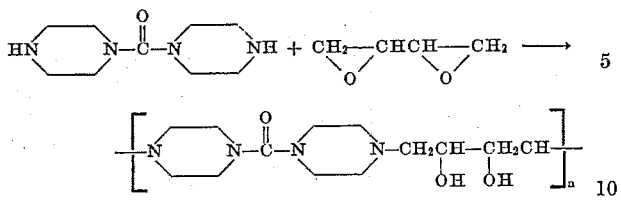

wherein $n$ represents the degree of polymerization and can be controlled by adjusting the ratio of the reactants to be 15 or more.

The second class, also a polyhydroxyaminourea which contains only one pendant hydroxyl group in each repeating unit, can be illustrated by the base catalyzed interaction of dicarbonyltripiperazine and epichlorohydrin.

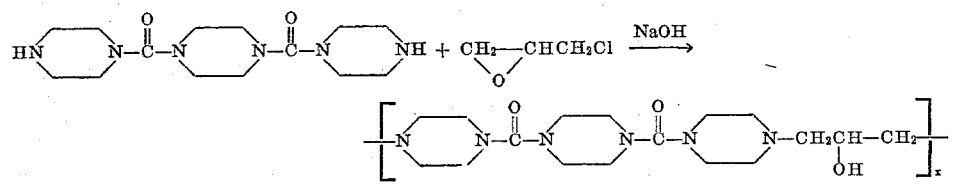

wherein $x$ represents the degree of polymerization and can be 15 or more.

The third class of polyhydroxyaminoetherureas containing two pendant hydroxyl groups and two ether oxygen linkages in each repeating unit is illustrated by the interaction of dicarbonyl tripiperazine and the diglycidyl ether of 2,2 - bis(p-hydroxyphenyl)propane (bisphenol A).

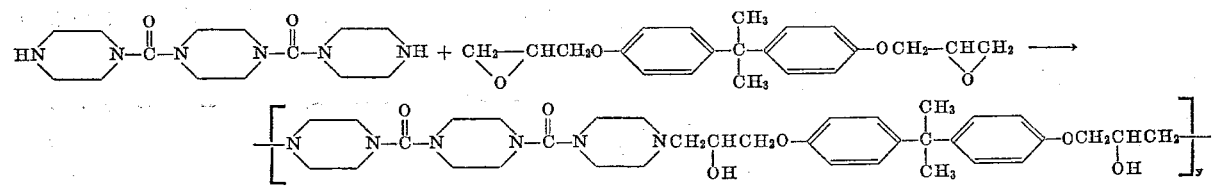

wherein $y$ represents the degree of polymerization and is at least 12.

If desired the properties of the polyhydroxyaminoureas and polyhydroxyaminoetherureas can be modified by further reacting the secondary hydroxyl groups pendant thereon. Reagents suitable for reaction with these hydroxyl groups include organic polyisocyanates, polymethylolated phenolic, melamine and urea derivatives, polycarboxylic acids, acid anhydrides or acid halides, polyaldehydes or formals.

Reduced viscosity values were computed by use of the equation:

$$\text{Reduced viscosity} = \frac{t_s - t_o}{c t_o}$$

wherein $t_o$ is the efflux time of the solvent, $t_s$ is the efflux time of the polymer solution, $c$ is the concentration of the polymer solution in terms of grams of polymer per 100 ml. of solvent.

For optimum mechanical properties in both films and fibers, the polymers of this invention preferably have reduced viscosities of at least 0.3 when measured as 0.2 g. samples in 100 ml. of dimethylformamide at 25° C. At this molecular weight fibers or threads can be drawn from the polymer melt. However, lower molecular weight polyhydroxyaminoureas and polyhydroxyaminoetherureas can be employed for the preparation of coating compositions.

For convenience and economic reasons it is preferred to employ atmospheric pressures in the preparation of the polyhydroxyaminoureas and polyhydroxyaminoetherureas. However, superatmospheric and subatmospheric pressures can also be used if preferred.

Temperature is not narrowly critical in the preparation of these polymers but it is preferred to use the reflux temperature of the charge. Thus, for example, in the preparation of a polyhydroxyaminoetherurea with a mixture of ethanol and dimethylsulfoxide as solvents, this reflux temperature is about 85° C. With ethanol alone the reflux temperature is a few degrees lower.

Reaction time is also not critical but usually several hours are required to obtain a significant yield of polymer.

The invention is further illustrated by the examples which follow in which all parts and percentages are by weight unless otherwise specified.

Example 1.—Preparation of dicarbonyl tripiperazine

To a 2 liter, 3-necked Morton flask equipped with a mechanical stirrer, thermometer, condenser and gas disparger were charged:

|  | Gm. |
|---|---|
| Piperazine (2 moles) | 172.8 |
| Benzene | 576 |
| Chlorobenzene | 224 |

These ingredients were warmed to 40° C. to effect solution. Phosgene were then introduced, with agitation of the reaction mixture, at 32–40° C. over a 2.5 hour period. A total of 99 gm. (1 mole) of phosgene was added. After the addition of the phosgene, the reaction mixture was agitated for an additional 30 minutes at 35° C. The precipitate which formed during the reaction was isolated by filtration. This precipitate was then returned to the reaction flask, the mother liquor was discarded, and the precipitate slurried in 500 ml. of distilled water. To this slurry was added a solution of:

|  | Gm. |
|---|---|
| NaOH (2 moles) | 80 |
| Distilled water | 240 | over a period of 1 hour. The temperature was maintained between 25–35° C. After the aqueous NaOH addition, the mixture was agitated for 1 hour. The precipitate which was formed in this reaction was isolated by filtration, washed with a small amount of water, and dried to a constant weight. This precipitate, a polyurea of piperazine, weighed 24 gms. and proved to be insoluble in common solvents and to be intractable. The mother liquor removed on filtration of the precipitate was evaporated to 50% of its original volume at reduced pressure and at a temperature of 30–60° C. A precipitate formed on cooling to room temperature. This precipitate was isolated by filtration and dried to constant weight. A yield of 75 gm.

was obtained. On heating 72 hrs. in a vacuum oven at 67° C. and 10–20 mm. Hg pressure with a slight air bleed, 42 gms. of material melting at approximately 220° C. was obtained. On recrystallization from 1500 ml. of monochlorobenzene, a yield of 21 gm. of dicarbonyl tripiperazine was obtained. This material showed the following analyses:

Found: Molecular wt., 310; percent N, 27.09; percent O, 10.32; Amine equivalent, 155. Calculated: Molecular wt., 310; percent N, 26.83; percent O, 10.47; Amine equivalent 155. These data and the infrared spectrum were consistent with the structure:

Example 2.—Preparation of a Polyhydroxyaminoetherurea

A round bottom flask was charged with 4.65 g. (0.015 mole) of dicarbonyl tripiperazine, 20.25 g. of ethanol and 27.0 g. of dimethylsulfoxide. After the mixture had been stirred at 35° C. for 30 minutes, 5.13 g. (0.015 mole) of the diglycidyl ether of bisphenol A was added and the reaction slurry heated to reflux to effect solution (85° C.). After two hours at reflux, the solution was stirred at room temperature for 16 hours and then heated to reflux again for an additional two hours. The polymer was isolated by coagulation in water, washing two times with water in a Waring Blendor and vacuum drying at 60° C. for 15 hours. The dried polyhydroxyaminoetherurea weighed 8.9 g. (91% yield). Isolated as a white, powdery material, the polymer was pressed at 160° C. and 15,000 p.s.i. into a strong, flexible clear, water-white film. A solution of the polymer in dimethyl formamide gave a reduced viscosity of 0.59 at 25° C. The following physical properties were determined:

| Test | Value | ASTM |
|---|---|---|
| Tensile modulus | 325,000 p.s.i. | D-882. |
| Tensile strength | 7,700 p.s.i. | D-882. |
| Elongation at break | 50% | D-882. |
| Pendulum impact | 160 ft. lbs./in.$^3$ | D-256. |
| Glass Transition temp. | 100° C. | |
| Melt flow | 0.1 decigrams per minute (220 p.s.i. at 220° C.). | |

The melt flow data and pressing of a film demonstrate that the polymer can be melt fabricated. By virtue of its solubility, in dimethyl formamide, for example, the polymer can also be fabricated into useful forms by the usual solution deposition techniques. The physical properties listed demonstrate the tough, thermoplastic nature of a polyhydroxyaminoetherurea. Furthermore, this polymer was found to have a low temperature transition as determined by the recording torsion pendulum technique at —45° C. This temperature is sufficiently lower than room temperature that it may be stated that the polymer is inherently tough in keeping with the disclosures of L. E. Nielsen in "Mechanical Properties of Polymers," Reinhold Publishing Corp., p. 180, 1962, N.Y.C. and E. G. Bobalek et al., Trans. Soc. Plastics Eng., 1, 93 (1961).

Example 3.—Preparation of a polyhydroxyaminoetherurea

The polymerization and isolation procedures of Example 2 were used. The following quantities of reactants and solvents were charged:

| Material | Weight, g. | Moles |
|---|---|---|
| Dicarbonyl tripiperazine | 3.10 | 0.010 |
| Ethanol | 16.5 | |
| Dimethylsulfoxide | 22.2 | |
| Diglycidylether of tetrachlorobisphenol A | 4.94 | 0.010 |

The isolated polyhydroxyaminoetherurea weighed 6.1 g. (78% yield) and had a reduced viscosity of 0.33 in dimethylformamide at 25° C. The following physical properties were determined:

| | | |
|---|---|---|
| Tensile modulus | p.s.i. | 255,000 |
| Tensile strength | p.s.i. | 4,200 |
| Elongation at break | percent | 20 |
| Pendulum impact | ft. lbs./in.$^3$ | 50 |
| Glass transition temp. | ° C. | 120 |

Example 4

Example 2 was duplicated and gave a polymer of reduced viscosity 0.57 in dimethylformamide at 25° C., thus, demonstrating the reproducibility of the reaction described in Example 2.

Example 5.—Preparation of a polyhydroxyaminourea

A round bottom flask was charged with 6.16 g. (0.020 mole) of dicarbonyl tripiperazine, 20.0 g. of dimethylsulfoxide (DMSO) and 6.0 g. of ethanol. After this mixture had been stored at room temperature overnight, 1.86 g. (0.020 mole) of epichlorohydrin was added and the mix stirred for one hour. Potassium carbonate, 3.04 g. (0.022 mole), was then added and the solution heated to reflux (80° C.), Additional quantities of solvent were added at the following times after reflux was reached.

| Solvent | Quantity, (ml.) | Time, (min.) |
|---|---|---|
| Water | 5 | 2 |
| Do | 5 | 5 |
| Do | 10 | 7 |
| DMSO | 10 | 15 |
| DMSO | 10 | 17 |
| DMSO | 20 | 85 |

After 85 minutes at reflux, the reaction mixture was cooled and poured into a large excess of cold water. The white precipitate of polyhydroxyaminourea was filtered off and vacuum dried at 50° C. overnight. The dried sample weighed 6.7 g. (81% yield) and gave a reduced viscosity of 0.17 in a one to one mixture of pyridine and water at 25° C. (0.2 g. sample/100 ml. of solution).

Example 6

A dry, round bottom flask equipped with a mechanical stirrer, a thermometer and a condsenser with an attached calcium chloride drying tube was charged with 3.10 g. (0.010 mole) of dicarbonyl tripiperazine, 30.0 g. of absolute methanol and 0.93 g. (0.010 mole) of epichlorohydrin. After stirring the solution for 16 hours at room temperature, 0.60 g. (0.011 mole) of sodium methoxide in 10.0 g. of absolute methanol was added and the mixture heated to reflux. During a total reflux time of six hours, 10 ml. of 1,4-dioxane was added after two hours and again after four hours. At the end of the six hour reaction period, another 20 ml. of dioxane was added and 40. ml. of a methanol-rich distillate collected. The residual polymer solution was poured into excess water to give a flocculant, white precipitate. After filtration and vacuum drying at 60° C., the solid polyhydroxyaminourea had a reduced viscosity of 0.20 as a 0.2 g. sample in 100 ml. of a one to one mixture of pyridine and water at 25° C. Fibers could be drawn from a melt of the polyhydroxyaminourea.

Example 7

A round bottom flask was charged with 3.10 g. (0.010 mole) dicarbonyl tripiperazine, 10.0 g. of ethanol, 0.94 g. (0.0101 mole) of epichlorohydrin and 2.0 g. of water. After stirring for one hour at room temperature, 0.45 g. (0.011 mole) of sodium hydroxide dissolved in 2.0 g. of water was added and the solution stirred for an additional 30 minutes before heating to reflux (80° C.). After reflux was reached, one ml. of monochlorobenzene was added at the following times; 40 min., 65 min., and 70 min. At the end of five hours. the reaction mixture was poured into a large excess of cold water and the precipitate collected by filtration. The solid polyhydroxyaminourea was vacuum dried at 60° C. and then gave a reduced viscosity of 0.21 as a 0.2 g. sample in 100 ml. of a one to one mixture of pyridine and water at 25° C.

Example 8

The procedure and quantities given in Example 7 were used. The isolated polyhydroxyaminourea thus obtained was redissolved in a one to one mixture of pyridine and water and then a one to one mixture of diethyl ether and ethanol added to reprecipitate the polymer. This reprecipitation procedure was repeated several times. After the polymer had been vacuum dried, the reduced viscosity as a 0.2 g. sample in 100 ml. of a one to one pyridine-water mixture was found to be 0.27 at 25° C. Strong fibers could be drawn from a polymer melt.

Examples 9 and 10

When the procedures described in Examples 2 and 5 are repeated with a dicarbonyl tripiperazine having methyl groups substituted in the 2 and 5 positions of each piperazine moiety, polyhydroxyaminoureas having similar properties are obtained.

Example 11

When the procedure described in Example 2 is repeated with butadiene dioxide in place of the diglycidyl ether of bisphenol A a polyhydroxyaminourea having properties comparable to the product afforded in Example 5 is obtained.

Although the invention has been described with a certain degree of particularity, it is understood that numerous changes can be made without departing from the spirit and scope of the invention.

What is claimed is:

1. Polyhydroxyaminourea having a reduced viscosity of at least about 0.3 when measured in dimethylformamide and about 0.2 when measured in a 1:1 mixture of water pyridine said polyhydroxyaminourea consisting essentially of repeating units having the general formula:

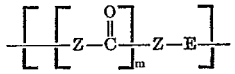

wherein Z is a 1,4-piperazine diradical, E is a hydroxyl containing radical residuum of a 1,2-epoxide and $m$ is an integer having values from 1 to 2.

2. The polyhydroxyaminourea claimed in claim 1 wherein Z is an unsubstituted 1,4-piperazine diradical.

3. The polyhydroxyaminourea claimed in claim 1 wherein Z is an alkyl substituted 1,4-piperazine diradical.

4. The polyhydroxyaminourea claimed in claim 1 wherein $m$ is 2 and E is the radical residuum of an epihalohydrin.

5. The polyhydroxyaminourea claimed in claim 4 wherein the epihalohydrin is epichlorohydrin.

6. The polyhydroxyaminourea claimed in claim 1 wherein $m$ is 2 and E is the radical residuum of a diepoxide.

7. The polyhydroxyaminourea claimed in claim 6 wherein the diepoxide is butadiene dioxide.

8. The polyhydroxyaminourea claimed in claim 6 wherein the diepoxide is the diglycidyl ether of 2,2-bis(p-hydroxyphenyl)-propane.

9. Method for the preparation of polyhydroxyaminourea having a reduced viscosity of at least about 0.3 when measured in dimethylformamide and about 0.2 when measured in a 1:1 mixture of water pyridine said polyhydroxyaminourea consisting essentially of repeating units having the general formula:

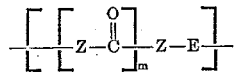

wherein Z is a 1,4-piperazine diradical, E is a hydroxyl containing radical residuum of a 1,2-epoxide and $m$ is an integer having values of from 1 to 2, which comprises:
 (a) reacting a carbonyl piperazine with an epoxide at elevated temperatures, and;
 (b) isolating the polyhydroxyaminourea product.

10. Method claimed in claim 9 wherein the carbonyl piperazine is N,N'-carbonylpiperazine.

11. Method claimed in claim 9 wherein the carbonyl piperazine is dicarbonyl tripiperazine.

12. Method claimed in claim 9 wherein the epoxide is an epihalohydrin.

13. Method claimed in claim 12 wherein the epihalohydrin is epichlorohydrin.

14. Method claimed in claim 9 wherein the epoxide is a diepoxide.

15. Method claimed in claim 14 wherein the diepoxide is butadiene dioxide.

16. Method claimed in claim 14 wherein the diepoxide is the diglycidyl ether of 2,2-bis(p-hydroxyphenyl)propane.

17. Method claimed in claim 9 wherein the reaction is carried out in a mixture of ethanol and dimethylsulfoxide.

18. Method claimed in claim 9 wherein the polyhydroxyaminourea is isolated by precipitation with water followed by filtration.

19. Article fabricated from the polyhydroxyaminourea claimed in claim 1.

20. Article claimed in claim 19 in the form of a fiber.

21. Article claimed in claim 19 in the form of a film.

22. Article claimed in claim 19 which is melt processable.

No references cited.

WILLIAM H. SHORT, *Primary Examiner.*

T. D. KERWIN, *Assistant Examiner.*